United States Patent
Van Der Huizen et al.

(10) Patent No.: US 12,043,714 B2
(45) Date of Patent: Jul. 23, 2024

(54) LATEX AND LATEX ARTICLES FORMED FROM BRANCHED POLYMERS

(71) Applicant: CARIFLEX PTE. LTD., Singapore (SG)

(72) Inventors: Adrie Van Der Huizen, Amsterdam (NL); Henk Van De Weg, Amsterdam (NL); Wouter De Jong, Amsterdam (NL); Maarten Tromp, Amsterdam (NL)

(73) Assignee: CARIFLEX PTE. LTD., Singapore (SG)

( * ) Notice: Subject to any disclaimer, the term of this patent is extended or adjusted under 35 U.S.C. 154(b) by 550 days.

(21) Appl. No.: 17/292,872

(22) PCT Filed: Dec. 3, 2019

(86) PCT No.: PCT/US2019/064177
§ 371 (c)(1),
(2) Date: May 11, 2021

(87) PCT Pub. No.: WO2020/117764
PCT Pub. Date: Jun. 11, 2020

(65) Prior Publication Data
US 2021/0403656 A1  Dec. 30, 2021

Related U.S. Application Data

(60) Provisional application No. 62/889,781, filed on Aug. 21, 2019, provisional application No. 62/775,624, filed on Dec. 5, 2018.

(51) Int. Cl.
| | | |
|---|---|---|
| *C08F 136/08* | (2006.01) | |
| *A41D 19/00* | (2006.01) | |
| *C08F 293/00* | (2006.01) | |
| *C08J 5/18* | (2006.01) | |
| *B29C 41/00* | (2006.01) | |
| *B29C 41/14* | (2006.01) | |
| *B29K 7/00* | (2006.01) | |
| *B29L 31/00* | (2006.01) | |
| *B29L 31/48* | (2006.01) | |

(52) U.S. Cl.
CPC ............ *C08J 5/18* (2013.01); *A41D 19/0055* (2013.01); *C08F 293/005* (2013.01); *B29C 41/003* (2013.01); *B29C 41/14* (2013.01); *B29K 2007/00* (2013.01); *B29L 2031/4864* (2013.01); *B29L 2031/7538* (2013.01); *C08J 2353/00* (2013.01)

(58) Field of Classification Search
CPC .............. C08F 297/046; C08F 297/044; C08F 136/08; C08F 4/48
USPC ................................................ 525/333.1, 342
See application file for complete search history.

(56) References Cited

U.S. PATENT DOCUMENTS

| | | |
|---|---|---|
| 5,451,439 A | 9/1995 | Bigg |
| 5,736,612 A | 4/1998 | Van Dongen et al. |
| 5,777,039 A | 7/1998 | De Craene et al. |
| 11,859,039 B2 * | 1/2024 | van der Huizen .. C08F 297/046 |
| 2003/0092810 A1 | 5/2003 | Altes et al. |
| 2006/0074207 A1 | 4/2006 | Halasa et al. |
| 2006/0155044 A1 | 7/2006 | Joly et al. |
| 2009/0101205 A1 | 4/2009 | Venderbosch et al. |
| 2012/0157615 A1 * | 6/2012 | Nishikawa ................ C08F 8/04 |
| | | 525/105 |
| 2013/0267649 A1 | 10/2013 | Sasajima et al. |
| 2015/0104663 A1 | 4/2015 | De Jong et al. |
| 2016/0333128 A1 | 11/2016 | Huizen |

FOREIGN PATENT DOCUMENTS

| | | |
|---|---|---|
| CN | 103270053 A | 8/2013 |
| CN | 105764970 A | 7/2016 |

OTHER PUBLICATIONS

Supplementary European Search Report for counterpart EP application No. 19892683.4, dated Jul. 25, 2022.
Office Action for counterpart CN application No. 201980080396.6, dated Aug. 3, 2022.
First Examination Report for counterpart IN application No. 202117022057, dated Aug. 30, 2022.
International Search Report and Written Opinion, PCT/US2019/064177, dated Feb. 11, 2020, 9 pages.

* cited by examiner

*Primary Examiner* — Mark S Kaucher

(57) ABSTRACT

Dipped formed latex articles with improved properties are formed from branched block copolymers, derived from alkenyl aromatic hydrocarbon—1,3-diene monomer system, and branched polyisoprene homopolymers, derived from isoprene. The polymers are obtained by polymerization in the presence of an anionic initiator; at a temperature from 0° C. to 100° C.; followed by coupling with a multifunctional coupling agent of formula $(R^1O)_3Si{-}Y{-}Si(OR^2)_3$, wherein $R_1$ and $R_2$ are independently $C_1$-$C_6$ alkyl groups; and Y is a $C_2$-$C_8$ alkylene group. The polymers are obtained as rubber cements having high solids content and low zero shear viscosities. The rubber cements are valuable for making latices and latex articles such as dipped goods, e.g., condoms, gloves, etc., with improved properties.

5 Claims, No Drawings

LATEX AND LATEX ARTICLES FORMED FROM BRANCHED POLYMERS

RELATED APPLICATIONS

This application is a National Stage Entry of PCT/US2019/064177 filed on Dec. 3, 2019, which claims priority to U.S. Provisional Application No. 62/775,624, filed on Dec. 5, 2018 and U.S. Provisional Application No. 62/889,781, filed on Aug. 21, 2019. The aforementioned applications are incorporated herein by reference in their entireties.

FIELD

The present disclosure relates to latex and articles made therefrom, comprising branched polymers made using polyfunctional coupling agents.

BACKGROUND

Elastomeric block copolymers and homopolymers are synthetic materials that are valuable for a wide array of end-use applications. Homopolymers and block copolymers having one or more blocks of a polymerized conjugated diene block are examples of such materials. Examples include styrenic block copolymers such as a styrene-butadiene block copolymer, and polybutadiene and polyisoprene homopolymers. Styrenic block copolymers and polyisoprenes having relatively narrow molecular weight distributions are generally prepared using anionic polymerization. Synthetic polyisoprenes are also produced by polymerizing isoprene using Ziegler Natta catalysts. Polyisoprene homopolymers are synthetic, predominantly stereoregular polymers that closely resemble natural rubber in molecular structure as well as in properties. The polymers are initially produced in organic solutions, which can subsequently be coagulated and dried into solid rubber, or converted into an aqueous latex form.

There is a continuing need for latex, latex articles made from block copolymers and homopolymers having enhanced properties, and also to further improve the productivity of the processes for making latex.

SUMMARY

One aspect of the disclosure is a latex article, e.g., dipped film made from a latex comprising a branched block copolymer, comprising one or more polymer blocks A and one or more polymer blocks B and having a formula $(A-B)_m(R^1O)_{3-m}Si—Y—Si(R^2O)_{3-n}(B-A)_n$. Each A block independently comprises at least 90 mole percent of an alkenyl aromatic hydrocarbon and has a weight average molecular weight from 9-15 kg/mol; wherein the one or more A blocks form 8-13 weight percent of the total weight of the block copolymer. Each B block is independently a poly(1,3-diene) block comprising at least 90 mole percent of one or more 1,3-dienes and having a weight average molecular weight from 75-150 kg/mol. $R^1$ and $R^2$ are independently H, or $C_1$-$C_6$ alkyl groups; Y is a $C_2$-$C_8$ alkylene group; m and n are integers independently having values from 1-3. The block copolymer has a coupling efficiency (CE) of at least 40%, preferably greater than 80%.

Another aspect of the disclosure is a latex article comprising a branched polyisoprene homopolymer having a formula $(C)_m(R^1O)_{3-m}Si—Y—Si(R^2O)_{3-n}(C)_n$, wherein each C block is a polyisoprene block independently having a weight average molecular weight from 400-1000 kg/mol, preferably 500-700 kg/mol. $R^1$ and $R^2$ are independently H, or $C_1$-$C_6$ alkyl groups; Y is a $C_2$-$C_8$ alkylene group; m and n are integers independently having values from 1-3. The homopolymer has a coupling efficiency (CE) of at least 40%, preferably greater than 80%.

DESCRIPTION

The following terms used the specification and will have the following meanings.

The term "active" is used to describe a polymer chain having a reactive carbanionic center at the growing end.

The term "coupling efficiency" (CE) is used to quantify the ratio of uncoupled polymer to coupled polymer as determined by GPC.

The term "degree of branching" refers to the average total number of polymer arms present per molecule of the branched block copolymer.

Multifunctional coupling agent: The branched block copolymers and branched polyisoprene homopolymers for use in making latex articles are prepared using a multifunctional coupling agent represented by the general formula (I):

$$(R^1O)_3Si—Y—Si(R^2O)_3 \quad (I);$$

where $R^1$ and $R^2$ are independently H, or $C_1$-$C_6$ alkyl groups, and Y is a $C_2$-$C_8$ alkylene group. The reactive polymer chain, having a carbanionic chain end, reacts with the 2 silicon centers of the coupling agent (I) to form coupled block copolymers and coupled homopolymers. Since formula (I) has 6 leaving groups (alkoxy groups), the coupling agent is hexafunctional and therefore in theory, anywhere from 1 to 3 polymer chains on each silicon can be present. Any hexafunctional organosilicon compound comprising the formula (I) can be used as the coupling agent. In an embodiment, the preferred multifunctional coupling agent is selected from the group consisting of 1,2-bis(trimethoxysilyl)ethane (BTMSE), 1,2-bis(triethoxysilyl)ethane (BTESE), or mixtures thereof.

Branched block copolymers and branched polyisoprene homopolymers: The branched block copolymers prepared using the multifunctional coupling agent of formula (I) comprises one or more polymer blocks A and one or more polymer blocks B are represented by the general formula (II):

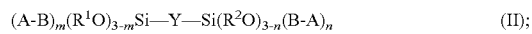

$$(A-B)_m(R^1O)_{3-m}Si—Y—Si(R^2O)_{3-n}(B-A)_n \quad (II);$$

where $R^1$, $R^2$, and Y are as defined above for formula (I), and m and n are integers that give a measure of the branching, as explained further below. In embodiments, the branched block copolymer (II) has $R^1$, and $R^2$ independently selected from H, methyl, or ethyl; and Y is a —$CH_2$—$CH_2$— group.

The A block is an aromatic block made predominantly of repeat units derived from one or more alkenyl aromatic hydrocarbons. In embodiments, the A block comprises at least 90 mole percent, 90-95 mole percent, or at least 95 mole percent of an alkenyl aromatic hydrocarbon. The weight percentage of the A block(s) in the overall block copolymer is generally less than 15 weight percent. In embodiments, the A block(s) form 8-13 weight percent, alternately 8-10 weight percent, alternately 10-13 weight percent. The A block has a weight average molecular weight from 9-15 kg/mol. In other embodiments, the A block molecular weight is 9-12 kg/mol, alternately 12-15 kg/mol. Any of the alkenyl aromatic hydrocarbons known in the art can be employed, e.g., styrene, alpha-methylstyrene, paramethylstyrene, vinylnaphthalene, and the like. Styrene is a preferred monomer.

The B block is an elastomeric block made predominantly of repeat units derived from one or more conjugated dienes (1,3-dienes). In embodiments, the B block comprises at least 90 mole percent, 90-95 mole percent, or at least 95 mole percent of a 1,3-diene. Each B block has a weight average molecular weight from 75-150 kg/mol. In other embodiments, the B block molecular weight can be 75-100 kg/mol, 100-125 kg/mol, or 125-150 kg/mol. Non-limiting examples of suitable 1,3-dienes to prepare the B block include butadiene, isoprene, piperylene, cyclohexadiene, 2,3-dimethyl-1,3-butadiene, myrcene, farnesene, and the like.

As for the values of m and n in formula (II), they range independently from 1 to 3. As the values of m and n increase from 1 to 3, the amount of more highly branched copolymer in the overall copolymer will correspondingly increase. In embodiments, the values of m and n in formula (II) can be 1,2; 1,3; 2,2; 2,3; 3,2; 3,1; and 3,3; respectively. When the reactive polymer chains couple with the multifunctional coupling agent, depending on the stoichiometry and reaction conditions, a mixture of branched block copolymers having a range of m and n values in the range of 1-3 are possible. Therefore, in theory, the overall product resulting from the coupling reaction can be characterized by average values for m and n, as well as an overall degree of branching which gives a measure of the total amount of branched block copolymer in the product. This in turn can influence the physical and/or chemical properties of the copolymer. In an aspect, the branched block copolymer (II) can have values of m and n between 1-3 such that (m+n) is greater than 2 but less than or equal to 6, which can be mathematically represented as: 2<(m+n)<6.

The branched polyisoprene homopolymers comprise one or more polymer blocks C and are represented by the general formula (III):

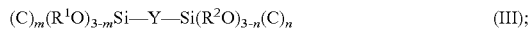

$(C)_m(R^1O)_{3-m}Si—Y—Si(R^2O)_{3-n}(C)_n$ (III);

where $R^1$, $R^2$, and Y are as defined above for formula (I), and m and n are as defined above for formula (II). The C block is made predominantly of repeat units derived from one or more conjugated dienes (1,3-dienes). Non-limiting examples of suitable 1,3-dienes useful to prepare the C block include butadiene, isoprene, piperylene, cyclohexadiene, 2,3-dimethyl-1,3-butadiene, myrcene, farnesene, and the like. The C blocks independently have a weight average molecular weight from 400-1000 kg/mol, preferably from 500-700 kg/mol. The degree of branching in the branched homopolymers (III) depends on the values of m and n and can vary in a similar fashion as explained above for the branched block copolymers (II). In an embodiment, m and n have values of 1 or 1. In another embodiment, m and n have values between 1-3 such that (m+n) is greater than 2 but less than or equal to 6, which can be mathematically represented as: 2<(m+n)≤6. The value of m+n can be from 3-6. In embodiments, the values of m and n in formula (III) can be 1,2; 1,3; 2,2; 2,3; 3,2; 3,1; and 3,3; respectively. In preferred embodiments, $R^1$, and $R^2$ are independently selected from H, methyl, or ethyl; and Y is a —CH$_2$—CH$_2$— group.

Process for making the branched copolymers: The branched block copolymer of formula (II) is obtained by first building the polymer block A and then block B, followed by coupling the reactive chain end with the multifunctional coupling agent (I). Block A is constructed by polymerizing a first monomer, which can be one or more alkenyl aromatic hydrocarbons comprising at least 90 mole percent of an alkenyl aromatic hydrocarbon, using an anionic initiator. Small amounts (up to 10 mole percent) of other anionically polymerizable monomers, such as for example, 1,3-dienes, can be present in the first monomer. Then a second monomer comprising at least 90 mole percent of one or more 1,3-dienes is added and polymerization provides block B. The second monomer can comprise small amounts (up to 10 mole percent) of another anionically polymerizable monomer, e.g., an alkenyl aromatic hydrocarbon. The reaction is carried out under an inert gas atmosphere (nitrogen or argon). The anionic initiator is generally an alkyllithium, such as n-butyllithium, sec-butyllithium, n-hexyllithium, etc. Suitable solvents are liquid hydrocarbon solvents, such as liquid lower hydrocarbon solvents, ex., n-pentane, cyclopentane, n-hexane, cyclohexane, n-heptane, etc. The reaction can be carried out at a temperature from −50° C. to 150° C., or from 20° C. to 100° C. Isoprene polymerizes in a predominantly linear fashion to form polyisoprene chains having a "living" anionic chain end. After the desired percent conversion of monomer has been reached, polymerization is terminated by adding the multifunctional coupling agent of formula (I). The resulting product (II) comprises the desired branched block copolymer, which if desired can be coagulated into a solid rubber product, or converted into an aqueous latex form.

The branched polyisoprene homopolymer (III) is obtained by polymerizing isoprene using an anionic initiator under conditions similar to that explained above, followed by coupling the reactive chain end with the multifunctional coupling agent (I). After the desired percent conversion of monomer has been reached, polymerization is terminated by coupling with the reagent (I). The resulting branched block copolymer can be coagulated into a solid rubber product, or converted into an aqueous latex form.

The rubber cement obtained above generally have a solids content from 5 wt. % to 35 wt. % in an embodiment, and from 15 wt. % to 25 wt. % in another embodiment. In embodiments, the cis content in the polyisoprene chain in the polymers (II) and (III) is in a range from 70% to 95%.

Temperature-dependent dynamic viscosity profiles indicate that for a given wt. % concentration, at comparable molecular weights, the viscosity of the copolymer (II) and homopolymer (III) are significantly less than the viscosity of the corresponding linear copolymers and homopolymers made without a coupling agent. In embodiments, the rubber cement having the polymer (II) at a solids content from 15 wt. % to 25 wt. %, has a cis content from 70% to 95%, a zero shear viscosity of less than 25,000 mPas, or less than 20,000 mPas, or less than 15,000 mPas; and a weight average molecular weight from 350 kg/mol to 700 kg/mol. In other embodiments, the rubber cement having the polymer (III) at a solids content from 15 wt. % to 25 wt. %, has a cis content from 70% to 95%, a zero shear viscosity of less than 80,000 mPas, or less than 75,000 mPas, or less than 70,000 mPas; and a weight average molecular weight from 1,000 kg/mol to 3,500 kg/mol. The reduced viscosity of the rubber cements provide valuable benefits in a manufacturing setup as it allows for handling up to a 100% or even higher throughput of the rubber cement without having to up-size process equipment.

The rubber solutions of the coupled polymers (II) or (III) in an organic solvent, resulting from the polymerization step, can be converted into water-based latices by mixing with an aqueous surfactant solution using a high-shear mixer. The solvent is subsequently removed from the resulting emulsion to <0.1% residual solvent. The resulting dilute aqueous latex can be concentrated to 60 wt. % rubber by centrifugation or creaming.

The surfactant used in the emulsification process also stabilizes the latex once formed. The amount of surfactant to be used is generally in the range from 0.5-2.0 wt. % based on the weight of the polyisoprene on a dry basis. Anionic surfactants are preferred. Examples of anionic surfactants include sodium dodecylbenzenesulphonate, other alkyl aryl sulphonates, alkyl sulphonates, olefin sulphonates (e.g., C14 olefin sulphonate), alcohol sulphates, such as sodium lauryl sulphate, optionally in combination with one or more other surfactants, such as potassium caprylate, polyoxyethylene cetyl/stearyl ether, and the like. In an embodiment, the surfactant can also be an alkali metal salt of a rosin type material, including rosins, dimerized rosins, disproportionated rosins, and hydrogenated rosins. In another embodiment, the surfactant can also be one or more members selected from the alkali metal salts of tall oil fatty acids, long chain fatty acids, e.g., having 12-20 carbon atoms, etc.

Properties: The latices of branched homopolymers (II) and copolymers (III) form dipped films of very good quality. Cured films formed therefrom have exhibited improved properties. In embodiments, cured films exhibit a tensile strength from 20 MPa to 40 MPa, or at least 25 MPa, or at least 30 MPa. In embodiments, the films also exhibit an elongation at break from 500% to 1250%, or 750% to 1250%, or at least 750%. In embodiments, the films also exhibit a tear strength from 15 kN/m to 35 kN/m, or at least 20 kN/m. It is also possible to form films having all 3 properties in the above ranges.

Uses of the branched polymers (II) and (III): The latices containing the polymers (II) or (III) are valuable for producing articles. The method comprises dipping a coagulant-free or coagulant coated former in the aqueous latex emulsion at least once to form a thin layer of latex film with individual particles of the coupled polyisoprene on the surface of the former. Any former known in the art can be used. The technique can also be used to layer more than one film of the latex particles on a former to produce articles, e.g., gloves, condoms, etc., then the latex film is stripped from the former.

EXAMPLES. In the examples, polymer molecular weights (called "weight average molecular weight" or "GPC molecular weight" herein) can be determined by HMW-GPC (gel permeation chromatography) using polystyrene calibration standards. Median particle size of the latices can be determined by laser diffraction using a Beckman Coulter LS13320. Solids content can be measured with a Sartorius MA35 moisture balance.

Coupling efficiency for the reaction with the multifunctional coupling agent can be determined by GPC from the peak integration ratios of the uncoupled polymer relative to the higher molecular weight coupled polymer.

Coagulant solution/dispersion was prepared by dissolving/dispersing $Ca(NO_3)_2 \cdot 4H_2O$ (~14%) and $CaCO_3$ (~5%) in water at 60° C. while stirring. All the latices, including the reference sample, were compounded with 5 phr of a commercially available masterbatch composition (containing sulphur, accelerators and anti-oxidant) and stabilized with a commercially available surfactant. The compounds were diluted with demineralized water to obtain the required solid content of 30%. The pH was adjusted to 11-11.5 by addition of a 1M KOH solution. The compounds were stored at ambient while stirring.

For the coagulant dipping exercise, metal plates were used and the standard dipping procedure was applied. Films were dipped after 1, 3 and 6 days of maturation. Mechanical properties of the dipped films were determined according to ASTM D412/ISO37 (Die C) using an Instron 3365 tensile bench equipped with a 500N load cell and a long-range travelling extensometer. The tensile properties are shown in Table 5.

Examples 1-5. Preparation of Branched Polyisoprene Homopolymers

Polymerizations were conducted under a nitrogen atmosphere in a 10 L stainless steel reactor equipped with agitator, cooling, temperature probe, pressure probe and auxiliaries for addition/withdrawal of solvent, monomers and other reagents. Solvents and monomers were purified over alcoa prior to use. As a general procedure, the reactor was charged with 5 L of dry solvent and 450 g of isoprene and heated to 60° C. A dilute s-BuLi solution (0.04 M) was added to the mixture to initiate the polymerization. After conversion of the required amount of monomer to the required molecular weight, the reaction was terminated by addition of the coupling agent (BTMSE or BTESE) in a molar ratio of living chains/coupling agent of 4/1. In some cases, this procedure was repeated once or twice until full conversion of monomer.

BTMSE and BTESE were evaluated in isoprene polymerizations at different living chain concentrations. The results are summarized in Table 1. The data shows that BTMSE and BTSE have comparable coupling performance.

TABLE 1

Coupling reactions of BTMSE and BTESE with different concentrations of living polyisoprene chains.

| Example | Coupling agent | Living chains (mmol) | Uncoupled after 1 h (%) | Uncoupled final (%) |
|---|---|---|---|---|
| 1 | BTMSE | 0.8 | 23 | 22 |
| 2 | BTMSE | 1 | 20 | 17 |
| 3 | BTMSE | 2 | 14 | 14 |
| 4 | BTESE | 0.55 | 33 | 29 |
| 5 | BTESE | 0.8 | 27 | 23 |

Examples 6-8: Preparation of branched polyisoprene homopolymers. These were prepared as rubber cements using the procedure described above. Results are shown in Table 2. The control sample was a linear (unbranched) polyisoprene made without using a coupling agent.

TABLE 2

Branched Polyisoprenes prepared.

| Example | Number of runs | Coupling agent | GPCMw (kg/mol) | cis content (%) |
|---|---|---|---|---|
| Control-1 | 1 | Not used | 3000 | 88 |
| 6 | 1 | BTMSE | 1660 | 78 |
| 7 | 2 | BTESE | 1083 | 75 |
| 8 | 2 | BTMSE | 1260 | 82 |

Examples 9-11: Preparation of branched polyisoprene rubber latex. The rubber cement sample was transferred to a bench scale latex production facility equipped with an in-line high shear mixing device with dosing pumps for polymer and soap solutions Emulsions were produced under standardized emulsification conditions from a fixed ratio of cement and aqueous solution of a potassium salt of disproportionated rosin acid. The emulsion was subsequently solvent stripped to obtain a dilute latex, which was concentrated by creaming after addition of sodium alginate. The results are shown in Table 3. Control-2 is a reference polyisoprene rubber latex prepared from the Control-1 rubber cement described above.

TABLE 3

Branched polyisoprene latices prepared.

| Example | Cement solids (wt %) | Soap (wt %) | R/S ratio | Dilute latex pH | Solids (wt %) | Solvent (ppmr) | Psmed (μ) | Concentrated latex pH | Solids (wt %) | Viscosity (cPs) | PSmed (μ) |
|---|---|---|---|---|---|---|---|---|---|---|---|
| Control-2 | 9 | 1 | 12.3 | 11.5 | 12 | 250 | 1.1 | 11.3 | 64 | 80 | 1.3 |
| 9 | 20 | 1.2 | 11.5 | 11.8 | 15.3 | 495 | 1.8 | 11.4 | 53 | 46 | 2 |
| 10 | 15 | 0.8 | 12.1 | 11.6 | 8.7 | 255 | 1 | 11.5 | 61 | 106 | 1.2 |
| 11 | 16 | 0.6 | 12.8 | 11.4 | 8 | 300 | 0.7 | 11.7 | 71 | 208 | 0.9 |

R/S ratio: Rubber/Soap ratio.
PSmed: Median particle size

TABLE 4

Tensile Properties of Cured Films.

| Film Example | Tensile strength (MPa) | Elongation (%) | Young's modulus (MPa) | Tear strength (kN/m) |
|---|---|---|---|---|
| Control-3 | 28 | 780 | 0.13 | 28 |
| 12 (latex ex. 10) | 24 | 663 | 0.22 | 27 |
| 13 (latex ex. 11) | 23 | 780 | 0.25 | 21 |

Table 4 shows that the tensile properties of the dipped films made from the branched polyisoprenes (Examples 12 and 13) made using the multifunctional coupling agents are very good and comparable to those seen with the control sample film (Control-3).

Example 14. Preparation of Branched Styrene-Isoprene Block Copolymers

The polymerization was conducted under a nitrogen atmosphere in a 10 L stainless steel reactor equipped with agitator, cooling, temperature probe, pressure probe and auxiliaries for addition/withdrawal of solvent, monomers and other reagents. Solvent and monomers were purified over alcoa prior to use. The reactor was charged with 5 L of dry solvent and 400 g of styrene and heated to 60° C. A dilute s-BuLi solution (0.04 M) was added to the mixture to initiate the polymerization. After conversion of the styrene, 3 kg of isoprene monomer was charged. After conversion of the second monomer to the required molecular weight, the reaction was terminated by addition of the BTMSE coupling agent in a molar ratio of living chains/coupling agent of 4/1. The results are shown in Table 5. Control-4 is a commercial lot sample of polyisoprene made using GPTS (glycidylpropyl trimethoxysilane) as the coupling agent.

TABLE 5

CE means coupling efficiency. DoB means degree of branching.

| Example | PS block GPC MW (kg/mol) | SI diblock GPC MW (kg/mol) | Coupling agent | CE | DoB |
|---|---|---|---|---|---|
| Control-4 | 10.8 | 159 | GPTS | 95 | 2.8 |
| 14 | 10.9 | 157 | BTMSE | 89 | 4.1 |

Example 15. Preparation of Branched Styrene-Isoprene Block Copolymer Latex

The rubber cement sample from Example 14 was transferred to a bench scale latex production facility equipped with an in-line high-shear mixing device with dosing pumps for polymer and soap solutions. The emulsion was produced under standardized emulsification conditions from a fixed ratio of cement and aqueous solution of a potassium salt of disproportionated rosin acid. The emulsion was subsequently solvent-stripped to obtain a dilute latex, which after addition of sodium alginate was concentrated by creaming. The results are shown in Table 6.

TABLE 6

| Example | Cement solids (wt %) | Soap (wt %) | R/S ratio | Dilute latex Solids (wt %) | Psmed (μ) | Concentrated latex pH | Solids (wt %) | Viscosity (cPs) | Psmed (μ) |
|---|---|---|---|---|---|---|---|---|---|
| 15 | 15.3 | 0.9 | 17.0 | 14.4 | 1.22 | 11.2 | 60.6 | 62 | 1.20 |

R/S ratio: Rubber/Soap ratio.
PSmed: Median particle size.

Example 16 represents a dipped film made from the branched styrene-isoprene block copolymer latex of Example 15. Control 5 represents a dipped film made from the branched styrene-isoprene block copolymer latex derived from the block copolymer of Control 4. Table 7 shows that the tensile properties of the dipped films made from the branched styrene-isoprene block copolymer made using the multifunctional coupling agent (Example 16) are very good and comparable to those seen with the control sample film (Control-5).

TABLE 7

| Example | Tensile strength | Modulus 500% | Elongation | Tear strength |
|---|---|---|---|---|
| Control 5 | 21.4 | 1.62 | 1089 | 24.7 |
| 16 | 20.4 | 1.43 | 1113 | 27.3 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A film article made of a latex comprising a branched polyisoprene homopolymer having a formula $(C)_m(R^1O)_{3-m}Si-Y-Si(R^2O)_{3-n}(C)_n$, wherein
each C block is independently a polyisoprene block having a weight average molecular weight from 400-1000 kg/mol;
$R^1$ and $R^2$ are independently H, or $C_1$-$C_6$ alkyl groups; Y is a $C_2$-$C_8$ alkylene group; m and n are integers independently having values from 1-3,
the branched polyisoprene homopolymer has a coupling efficiency (CE) of at least 40%; and
wherein
the film article exhibits a tensile strength of at least 20 MPa.

2. The film article of claim 1, wherein (m+n) has a value from 3-6.

3. The film article of claim 1, wherein Y is —$CH_2CH_2$—, and $R^1$ and $R^2$ are hydrogen, methyl groups or ethyl groups.

4. The film article of claim 1, wherein the C block has a weight average molecular weight from 500-700 kg/mol.

5. The film article of claim 1, wherein the film article exhibits at least one of an elongation at break of at least 500%, and a tear strength of at least 15 kN/m.

* * * * *